(12) United States Patent
Mitsunobu et al.

(10) Patent No.: US 12,371,771 B2
(45) Date of Patent: Jul. 29, 2025

(54) PLATED STEEL

(71) Applicant: NIPPON STEEL CORPORATION, Tokyo (JP)

(72) Inventors: Takuya Mitsunobu, Tokyo (JP); Hiroshi Takebayashi, Tokyo (JP); Takehiro Takahashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 83 days.

(21) Appl. No.: 18/251,629

(22) PCT Filed: Jan. 14, 2022

(86) PCT No.: PCT/JP2022/001109
§ 371 (c)(1),
(2) Date: May 3, 2023

(87) PCT Pub. No.: WO2022/154082
PCT Pub. Date: Jul. 21, 2022

(65) Prior Publication Data
US 2023/0407448 A1    Dec. 21, 2023

(30) Foreign Application Priority Data
Jan. 14, 2021 (JP) ................................. 2021-004021

(51) Int. Cl.
*C23C 2/06* (2006.01)
*B32B 15/01* (2006.01)
(Continued)

(52) U.S. Cl.
CPC .............. *C23C 2/06* (2013.01); *B32B 15/011* (2013.01); *C21D 1/74* (2013.01); *C21D 1/84* (2013.01);
(Continued)

(58) Field of Classification Search
None
See application file for complete search history.

(56) References Cited

U.S. PATENT DOCUMENTS

| 4,287,009 A | * | 9/1981 | Allegra | ..................... C23C 2/29 |
| | | | | 148/531 |
| 2012/0282488 A1 | * | 11/2012 | Fujii | ........................ C23C 2/12 |
| | | | | 427/349 |

(Continued)

FOREIGN PATENT DOCUMENTS

| EP | 3733922 A1 | 11/2020 |
| JP | 2003-113456 A | 4/2003 |

(Continued)

*Primary Examiner* — Seth Dumbris
(74) *Attorney, Agent, or Firm* — Renner, Otto, Boisselle & Sklar, LLP

(57) ABSTRACT

This plated steel includes: a steel; and a plating layer formed on the steel, in which the plating layer contains, as a chemical composition, by mass %, Zn: 1.0% to 30.0%, Mg: 0% to 10.0%, Si: 0.05% to 10.0%, Fe: 0 to 10.0%, 0% to 5.00% in total of one or two or more selected from Ca: 0% to 3.00%, Sb: 0% to 0.50%, Pb: 0% to 0.50%, Sr: 0% to 0.50%, Sn: 0% to 1.00%, Cu: 0% to 1.00%, Ti: 0% to 1.00%, Ni: 0% to 1.00%, Mn: 0% to 1.00%, Cr: 0% to 1.00%, La: 0% to 1.00%, Ce: 0% to 1.00%, Zr: 0% to 1.00%, and Hf: 0% to 1.00%, and a remainder of Al and impurities, a microstructure of the plating layer contains an α phase which is a solid solution of Al and Zn, and the α phase contains a Zn phase having a grain size of 10 to 200 nm in a number density of $10/100\ \mu m^2$ or more.

7 Claims, 1 Drawing Sheet

(51) Int. Cl.
*C21D 1/74* (2006.01)
*C21D 1/84* (2006.01)
*C21D 8/02* (2006.01)
*C21D 9/46* (2006.01)
*C22C 21/00* (2006.01)
*C22C 21/02* (2006.01)
*C22C 21/10* (2006.01)
*C22C 38/02* (2006.01)
*C22C 38/04* (2006.01)
*B23K 11/11* (2006.01)

(52) U.S. Cl.
CPC ......... *C21D 8/0205* (2013.01); *C21D 8/0278* (2013.01); *C21D 9/46* (2013.01); *C22C 21/00* (2013.01); *C22C 21/02* (2013.01); *C22C 21/10* (2013.01); *C22C 38/02* (2013.01); *C22C 38/04* (2013.01); *B23K 11/11* (2013.01); *C21D 2251/02* (2013.01); *C21D 2261/00* (2013.01); *Y10T 428/12757* (2015.01)

(56) References Cited

U.S. PATENT DOCUMENTS

| | | |
|---|---|---|
| 2014/0120366 A1 | 5/2014 | Sohn |
| 2018/0223386 A1 | 8/2018 | Machado et al. |
| 2020/0024708 A1 | 1/2020 | Sengoku et al. |
| 2021/0340650 A1* | 11/2021 | Park .................. C23C 2/04 |

FOREIGN PATENT DOCUMENTS

| | | |
|---|---|---|
| JP | 2014-527120 A | 10/2014 |
| JP | 2018-527462 A | 9/2018 |
| KR | 1020200035740 A | 4/2020 |
| WO | 2017/017513 A1 | 2/2017 |
| WO | 2017/017514 A1 | 2/2017 |
| WO | 2018/179397 A1 | 10/2018 |

* cited by examiner

PLATED STEEL

TECHNICAL FIELD OF THE INVENTION

The present invention relates to a plated steel.

Priority is claimed on Japanese Patent Application No. 2021-004021, filed Jan. 14, 2021, the content of which is incorporated herein by reference.

RELATED ART

In recent years, there has been a demand for curbing the consumption of chemical fuels in order to protect the environment and prevent global warming. To such a demand, for example, vehicles, which are indispensable for daily life and activities as movement units, are no exception. In response to such a demand, in vehicles, an improvement in fuel efficiency or the like by a reduction in weight of a vehicle body or the like is being studied. Since most of structures of vehicles are formed of iron, particularly steel sheets, thinning steel sheets and reducing the weight has a great effect on the reduction in weight of a vehicle body. However, when the steel sheet is simply reduced in thickness to reduce the weight of the steel sheet, there is concern that the strength of a structure decreases and safety decreases. Therefore, in order to reduce the thickness of the steel sheet, it is required to increase a mechanical strength of the steel sheet to be used so as not to reduce the strength of the structure.

Therefore, research and development are being conducted on a steel sheet that can maintain or increase the mechanical strength even when the steel sheet is made thinner than previously used steel sheets by increasing the mechanical strength of the steel sheet. Such a demand for a steel sheet is applied not only to a vehicle manufacturing industry but also to various manufacturing industries.

In general, a material having high mechanical strength tends to have low shape fixability in a forming process such as bending, and in a case where the material is processed into a complex shape, the processing itself becomes difficult. As one of methods for solving problems of formability, application of a so-called hot stamping method can be mentioned. In the hot stamping method, a material to be formed is once heated to a high temperature to be austenitized, and the material softened by the heating is subjected to press working to be formed, and is rapidly cooled with a die after the forming or simultaneously with the forming to undergo martensitic transformation, so that a product having high strength after the forming can be obtained.

According to the hot stamping method, since the material is once heated to a high temperature to be softened, and the material is subjected to press working in a softened state, the material can be easily subjected to press working. Therefore, by this hot press working, a press-formed article having both good shape fixability and high mechanical strength can be obtained. In particular, in a case where the material is steel, the mechanical strength of the press-formed article can be increased due to a quenching effect by cooling after forming.

However, in a case where the hot stamping method is applied to a steel sheet, heating to a high temperature of, for example, 800° C. to 850° C. or higher causes oxidation of iron or the like on a surface and formation of scale (oxide). Therefore, a step of removing the scale (descaling step) is required after the hot press working is performed, resulting in a reduction in productivity. In addition, for a member or the like that requires corrosion resistance, it is necessary to perform an antirust treatment or a metal coating on a surface of the member after working, so that a surface cleaning step and a surface treatment step are required, which also reduces productivity.

As an example of a method of suppressing such a reduction in productivity, there is a method of coating a steel sheet. In general, as a coating of a steel sheet, various materials such as an organic material and an inorganic material are used. In particular, for steel sheets, a zinc-based plating having a sacrificial protection action has been widely applied from the viewpoint of anticorrosion performance and a steel sheet production technology. On the other hand, a heating temperature at the time of pressing is often higher than an Ac3 transformation point of steel in order to obtain a quenching effect, and for example, the heating temperature is about 800° C. to 1000° C. However, this heating temperature is higher than a decomposition temperature of the organic material, a boiling point of a metal material such as a Zn-based material, and the like. Therefore, in a case where a steel sheet coated with an organic material or a Zn-based metal material is heated for hot pressing, a plating layer on a surface of the steel sheet evaporates, which may cause significant deterioration of surface properties.

In order to avoid such deterioration of the surface properties, for a steel sheet that is heated to a high temperature to be subjected to hot press working, for example, the steel sheet is preferably coated with an Al-based metal having a higher boiling point than an organic material coating or a Zn-based metal coating.

By using the steel sheet coated with the Al-based metal, a so-called Al-plated steel sheet, adhesion of scale to a surface of the steel sheet can be prevented, and a step such as a descaling step becomes unnecessary, resulting in an improvement in productivity. In addition, since the Al-based metal coating also has an antirust effect, corrosion resistance after coating is also improved.

Therefore, as a steel sheet for hot stamping, an Al-plated steel sheet having an Al-plated surface has begun to be applied.

However, in a case where the Al-plated steel sheet is subjected to hot stamping, there is a problem in that chemical convertibility of a steel sheet after hot stamping (hot stamped member) is not sufficient.

In order to improve the chemical convertibility of the steel sheet after hot stamping, it has been proposed to include Zn or Mg in a plating layer. However, inclusion of Zn or Mg in the plating layer may cause cracking due to LME when spot welding is performed.

For example, Patent Document 1 discloses a steel sheet coated with a metal coating containing 2.0 to 24.0 wt % of zinc, 7.1 to 12.0 wt % of silicon, optionally 1.1 to 8.0 wt % of magnesium, and optionally additive elements selected from Pb, Ni, Zr, or Hf, in which a weight amount of each of the additive elements is less than 0.3 wt %, a remainder consists of aluminum, optional unavoidable impurities, and residual elements, and an Al/Zn ratio exceeds 2.9.

Patent Document 2 discloses a method of manufacturing a cured component, which is a method of obtaining a component that does not have a problem of LME caused by hot forming when performing hot forming on a steel sheet coated in advance with a metal coating containing 2.0 to 24.0 wt % of zinc, 1.1 to 7.0 wt % of silicon, optionally 1.1 to 8.0 wt % of magnesium in a case where the amount of silicon is between 1.1 to 4.0 wt %, and optionally additive elements selected from Pb, Ni, Zr, or Hf, in which a weight amount of each of the additive elements is less than 0.3 wt %, a remainder consists of aluminum, unavoidable impurities, and residual elements.

PRIOR ART DOCUMENT

Patent Document

[Patent Document 1] PCT International Publication No. WO2017/017513
[Patent Document 2] PCT International Publication No. WO2017/017514

DISCLOSURE OF THE INVENTION

Problems to be Solved by the Invention

However, in Patent Document 1, no examination was conducted regarding LME.

In addition, in the method of Patent Document 2, although an effect of suppressing LME during hot forming such as hot stamping was recognized, as a result of examination by the present inventors, it was found that in a case where spot welding is performed on a component obtained by this method, LME occurs.

As described above, in a related art, an Al-plated steel having excellent chemical convertibility after hot stamping and being capable of suppressing LME during spot welding has not been proposed. Therefore, an object of the present invention is to provide a plated steel having excellent chemical convertibility after hot stamping and being capable of suppressing LME during spot welding (having excellent LME resistance) on the premise of an Al-plated steel (a steel including a plating layer containing Al).

Means for Solving the Problem

The present inventors examined chemical convertibility after hot stamping and LME during spot welding. As a result, it was found that by limiting a chemical composition of a plating layer and allowing a Zn phase having a predetermined size to be present in an Al plating layer, excellent chemical convertibility is achieved after hot stamping and LME during spot welding is suppressed.

The present invention has been made based on the above findings, and the gist thereof is as follows.

[1] A plated steel according to an aspect of the present invention includes: a steel: and a plating layer formed on the steel, in which the plating layer contains, as a chemical composition, by mass %, Zn: 1.0% to 30.0%, Mg: 0% to 10.0%, Si: 0.05% to 10.0%, Fe: 0 to 10.0%, 0% to 5.00% in total of one or two or more selected from Ca: 0% to 3.00%, Sb: 0% to 0.50%, Pb: 0% to 0.50%, Sr: 0% to 0.50%, Sn: 0% to 1.00%, Cu: 0% to 1.00%, Ti: 0% to 1.00%, Ni: 0% to 1.00%, Mn: 0% to 1.00%, Cr: 0% to 1.00%, La: 0% to 1.00%, Ce: 0% to 1.00%, Zr: 0% to 1.00%, and Hf: 0% to 1.00%, and a remainder of Al and impurities, a microstructure of the plating layer contains an $\alpha$ phase which is a solid solution of Al and Zn, and the $\alpha$ phase contains a Zn phase having a grain size of 10 to 200 nm in a number density of $10/100$ $\mu m^2$ or more.

[2] In the plated steel according to [1], in the chemical composition, by mass %, Mg: 0.5% to 10.0% may be satisfied.

[3] In the plated steel according to [1], in the chemical composition, by mass %, Mg: 3.0% to 7.0%, and Zn: 7.0% to 18.0% may be satisfied.

[4] In the plated steel according to any one of [1] to [3], an Fe—Al-based alloy layer may be formed between the steel and the plating layer, and an average thickness of the Fe—Al-based alloy layer may be 1.0 to 10.0 $\mu m$.

[5] In the plated steel according to any one of [1] to [4], the Zn phase may be contained in the $\alpha$ phase in a number density of $30/100$ $\mu m^2$ or more.

Effects of the Invention

According to the above aspect of the present invention, it is possible to provide a plated steel having excellent chemical convertibility after hot forming and excellent LME resistance during spot welding.

EMBODIMENTS OF THE INVENTION

Figure 1:
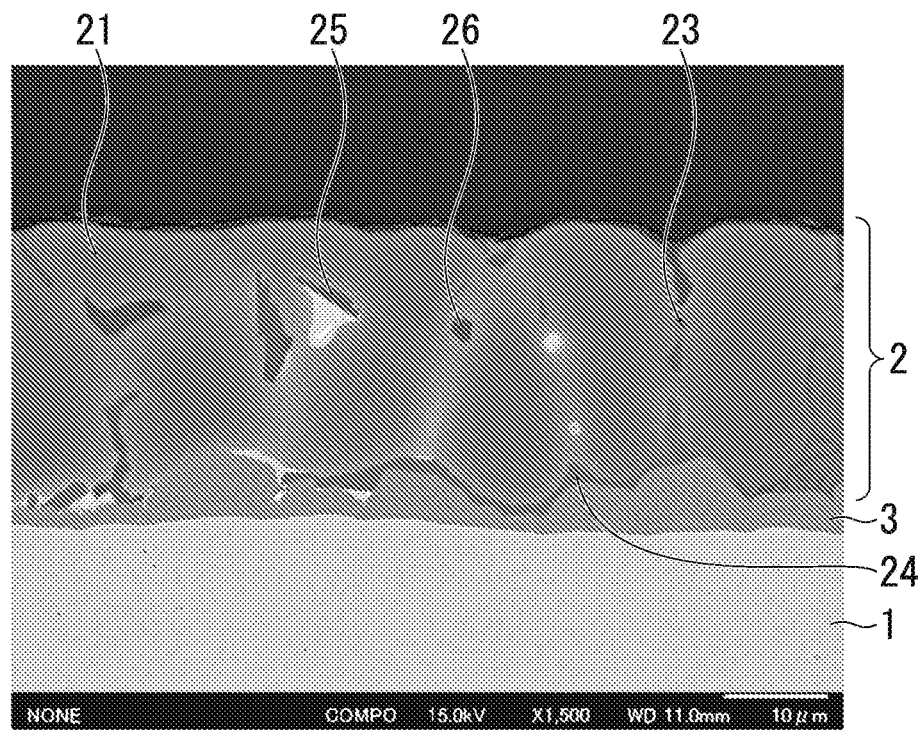
FIG. 1 is an example of a photograph of a cross-sectional microstructure of a plating layer of a plated steel according to the present embodiment.
Figure 2:
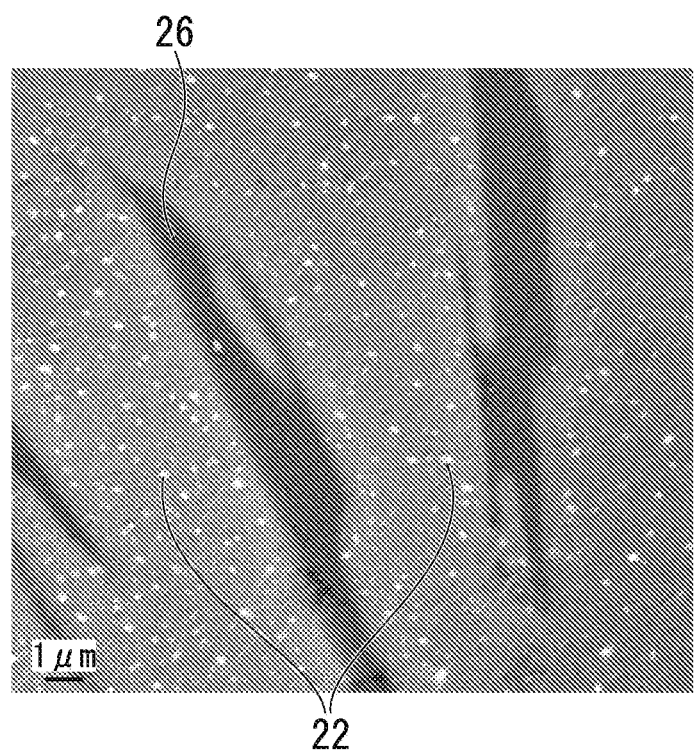
FIG. 2 is an example of an enlarged image of an $\alpha$ phase in the cross-sectional microstructure of the plating layer of the plated steel according to the present embodiment.

As shown in FIGS. 1 and 2, a plated steel according to an embodiment of the present invention (a plated steel according to the present embodiment) includes a steel 1 and a plating layer 2 formed on the steel 1.

In addition, the plating layer 2 has a predetermined chemical composition, a microstructure thereof has an $\alpha$ phase 21, and the $\alpha$ phase 21 contains a Zn phase 22 having a grain size of 10 to 200 nm in a number density of $10/100$ $\mu m^2$ or more.

<Steel>

The plating layer 2 is important for the plated steel according to the present embodiment, and the kind of the steel 1 is not particularly limited. The kind of the steel 1 may be determined depending on an applicable product, a required strength, a sheet thickness, and the like. For example, a steel sheet such as a hot-rolled steel sheet described in JIS G 3131:2018 or a cold-rolled steel sheet described in JIS G 3141:2017 can be used.

<Plating Layer>

The plated steel according to the present embodiment includes the plating layer 2 on the steel 1 (for example, on a surface of the steel 1, or in a case where an Fe—Al-based alloy layer 3 is formed between the steel 1 and the plating layer 2, on a surface of the Fe—Al-based alloy layer 3). The plating layer 2 may be formed on one surface of the steel 1 or may be formed on both surfaces.

[Chemical Composition]

Regarding the chemical composition of the plating layer 2 included in the plated steel according to the present embodiment, the reason for limiting each element included will be described. % regarding the amount of each element is mass %.

Zn: 1.0% to 30.0%

Zn is an element that forms a Zn oxide on the surface of the steel by hot stamping. In a case where the Zn oxide is present on the surface of steel after hot stamping, chemical convertibility is improved. In addition, Zn is also an element that contributes to an improvement in corrosion resistance of the plating layer by an improvement in sacrificial protection properties. In order to obtain these effects, a Zn content is set to 1.0% or more. The Zn content is preferably 5.0% or more, and more preferably 7.0% or more.

On the other hand, when the Zn content exceeds 30.0%, it becomes difficult to suppress LME. Therefore, the Zn content is set to 30.0% or less. The Zn content is preferably 18.0% or less, and more preferably 15.0% or less.

Mg: 0% to 10.0%

Mg is an element having an effect of forming a Zn—Mg oxide together with Zn on the surface of the steel during hot stamping and enhancing the chemical convertibility of the steel after hot stamping. In terms of improving the chemical convertibility, the Zn—Mg oxide has a greater effect than the Zn oxide. Mg does not necessarily need to be contained, but may be contained in order to obtain the above-mentioned effects. In a case of sufficiently obtaining the above effects, a Mg content is preferably set to 0.5% or more. The Mg content is more preferably 3.0% or more.

On the other hand, when the Mg content exceeds 10.0%, there arises a manufacturing problem such as an increase in the amount of dross generated in a plating bath. Therefore, the Mg content is set to 10.0% or less. The Mg content is preferably 7.0% or less.

Si: 0.05% to 10.0%

Si is an element having an effect of suppressing the formation of an excessively thick alloy layer formed between the steel sheet and the plating layer in forming the plating layer on the steel sheet and enhancing the adhesion between the steel sheet and the plating layer. In addition, in a case where Si is included together with Mg, Si is also an element that forms a compound with Mg and contributes to an improvement in corrosion resistance after coating. In order to obtain the above effects, a Si content is set to 0.05% or more. The Si content is preferably 0.1% or more, and more preferably 1.0% or more.

On the other hand, when the Si content exceeds 10.0%, workability of the plating layer decreases. Therefore, the Si content is set to 10.0% or less.

Fe: 0% to 10.0%

When the plating layer is formed, Fe diffuses from the steel to the plating layer and is thus incorporated into the plating layer. When the Fe content is 10.0% or less, an adverse effect on properties of the plated steel according to the present embodiment is small. Therefore, an Fe content is set to 10.0% or less.

On the other hand, as described above, Fe is incorporated into the plating layer in a process of forming the plating layer. It is significantly costly to completely prevent the incorporation of Fe. Therefore, the Fe content may be set to 0.5% or more.

0% to 5.00% in Total of One or Two or More Selected from Ca: 0% to 3.00%, Sb: 0% to 0.50%, Pb: 0% to 0.50%, Sr: 0% to 0.50%, Sn: 0% to 1.00%, Cu: 0% to 1.00%, Ti: 0% to 1.00%, Ni: 0% to 1.00%, Mn: 0% to 1.00%, Cr: 0% to 1.00%, La: 0% to 1.00%, Ce: 0% to 1.00%, Zr: 0% to 1.00%, and Hf: 0% to 1.00%

The plating layer of the plated steel according to the present embodiment includes one or two or more of Ca, Sb, Pb, Sr, Sn, Cu, Ti, Ni, Mn, Cr, La, Ce, Zr, and Hf as impurities or by intentional addition within the above ranges.

When a Ca content is high. Ca-based intermetallic compounds such as a $CaZn_{11}$ phase are formed, and the corrosion resistance decreases. Therefore, the Ca content is set to 3.00% or less.

On the other hand, when Ca is contained in the plating layer, the amount of dross that is likely to be formed during plating as the Mg content increases, decreases, so that plating manufacturability is improved. Therefore, Ca may be contained in a range of 3.00% or less.

When a Sb content, a Sr content, or a Pb content are excessive, a viscosity of the plating bath increases, and it is often difficult to build the plating bath itself. In this case, a plated steel sheet having good plating properties cannot be manufactured. Therefore, the Sr content is set to 0.50% or less, the Sb content is set to 0.50% or less, and the Pb content is set to 0.50% or less.

When Sr, Sb, or Pb are contained in the plating layer, an external appearance of the plating layer changes, spangles are formed, and an improvement in metallic gloss is confirmed. Therefore, each of these elements may be contained in a range of 0.50% or less.

Sn is an element that increases a Mg elution rate in the plating layer containing Zn, Al, and Mg. When the elution rate of Mg increases, the corrosion resistance of a flat portion deteriorates. Therefore, a Sn content is set to 1.00% or less.

When a Cu content, a Ti content, a Ni content, or a Mn content are excessive, the viscosity of the plating bath increases, and it is often difficult to build the plating bath itself. In this case, a plated steel sheet having good plating properties cannot be manufactured. Therefore, the amount of each element is preferably set to 1.00% or less.

On the other hand, these elements are elements that contribute to the improvement in corrosion resistance. Therefore, these elements may be contained in a range of 1.00% or less.

When a La content or a Ce content are excessive, the viscosity of the plating bath increases, and it is often difficult to build the plating bath itself. In this case, a plated steel having good plating properties cannot be manufactured. Therefore, each of the La content and the Ce content is set to 1.00% or less.

When a Zr content or a Hf content are excessive, the corrosion resistance may decrease. Therefore, the Zr content and the Hf content are each set to 1.00% or less.

The chemical composition of the plating layer of the plated steel sheet according to the present embodiment has the above-mentioned chemical composition, and a remainder of Al and impurities. An Al content is 35.0% or more, preferably 50.0% or more, and more preferably 70.0% or more.

The chemical composition of the plating layer is measured by the following method.

First, an acid solution is obtained by peeling and dissolving the plating layer with an acid containing an inhibitor that suppresses corrosion of the base metal (steel). Next, the chemical composition of the plating layer can be obtained by measuring the obtained acid solution by an ICP analysis. The kind of the acid is not particularly limited as long as the acid is an acid capable of dissolving the plating layer. The chemical composition is measured as an average chemical composition.

[Microstructure]

The microstructure of the plating layer of the steel according to the present embodiment includes an $\alpha$ phase which is a solid solution of Al and Zn, and in this $\alpha$ phase, a Zn phase having a grain size of 10 to 200 nm is present in a number density of $10/100$ $\mu m^2$ (10 $\mu m \times 10$ $\mu m$) or more.

In a case where the plating layer has the above-described microstructure, the plating layer is excellent in chemical convertibility and in LME resistance during spot welding after hot stamping.

The present inventors consider the reason as follows.

In a case where the plated steel according to the present embodiment is heated for hot stamping, in the plating layer, the Zn phase dispersed in the plating layer, particularly in the α phase, becomes a liquid phase. Then, the infiltration of oxygen into the plating layer is promoted by using this liquid phase as an infiltration path. As a result, a Zn oxide (in a case where the plating layer contains Mg, a Zn—Mg oxide is also included) is efficiently formed on the surface layer of the plating layer. In the steel after hot stamping, due to the formation of this Zn oxide (and/or the Zn—Mg oxide), the chemical convertibility is improved.

In addition, in a case where the Zn phase 22 is finely dispersed as described above, the oxidation of Zn is promoted during heating for the hot stamping, so that remaining of a metal Zn phase is suppressed in the steel after hot stamping. Since the metal Zn phase in the steel causes LME during spot welding, the plated steel according to the present embodiment in which the metal Zn phase is not present or is suppressed to a very small amount even if the metal Zn phase is present, is excellent in LME resistance during spot welding of the steel after hot stamping.

In a case where the number density of the Zn phase 22 in the α phase 21 is low, the oxidation of Zn does not proceed sufficiently and Zn remains as a metal phase even after hot stamping, which causes LME to occur during spot welding. Therefore, the number density of the Zn phase 22 is set to 10 or more in an area of (10 μm×10 μm). An upper limit of the number density does not need to be limited, but may be 70/100 μm$^2$ or less.

The reason for limiting the number density of the Zn phase having a grain size of 10 to 200 nm is that when a grain size of Zn is less than 10 nm, the oxidation promotion effect is insufficient, and when a grain size of Zn is more than 200 nm, the infiltration path of oxygen is localized, making it difficult to uniformly oxidize Zn in the plating layer.

An area ratio of the α phase 21 in the plating layer is preferably 80.0% to 95.0%. When the area ratio of the α phase 21 is less than 80.0%, there is concern that a coarse Zn phase is formed and causes LME during hot stamping. On the other hand, when the area ratio of the α phase 21 exceeds 95.0%, there is concern that it becomes difficult to obtain sufficient chemical convertibility after heating for hot stamping.

In addition, in the microstructure of the plating layer 2 of the plated steel according to the present embodiment, examples of the remainder include a MgZn$_2$ phase 23, a Mg$_2$Zn$_3$ phase, a MgZn phase, and a Mg$_2$Si phase 24 which are Mg-based intermetallic compounds (IMC), a bulky Zn phase 25, a Si phase 26, and other intermetallic compound phases. From the viewpoint of improving the corrosion resistance, an area ratio of the Mg-based intermetallic compounds may be set to 2.0% or more.

In the present embodiment, an area ratio of each phase in the plating layer is obtained by the following method.

First, a prepared sample is cut into a size of 25 mm×25 mm, is embedded in a resin, and is then polished to a mirror finish. Thereafter, a SEM-EDS element map image is obtained from a cross section of the plating layer in a thickness direction at a magnification of 1500-fold. The element map image is taken so that the entire thickness of the hot-dip plating layer is included in a visual field. Photographing positions are randomly selected. The photographing positions should not be reselected according to a calculation result of the area ratio.

Each microstructure and each phase are specified from the element map image. Then, by a computer image analysis, total cross-sectional areas of each microstructure and each phase appearing in the cross-sectional photograph of the entirety are measured, and this is divided by a cross-sectional area of the hot-dip plating layer appearing in the cross-sectional photograph of the entirety, whereby the area ratios of each microstructure and each phase are calculated.

In addition, the number density of the Zn phase having a grain size of 10 to 200 nm in the α phase is obtained by the following method.

Similar to the case where the area ratio of each phase is obtained, a sample is embedded in a resin and is then polished to a mirror finish. Thereafter, a cross section of the plating layer is photographed at a magnification of 10,000-fold to obtain a SEM-BSE (backscattered electrons) image of the α phase in the plating layer. Thereafter, the number of Zn phases having a grain size of 10 to 200 nm observed in the α phase are counted, and the total number thereof is divided by the area of the α phase in an observed visual field, thereby calculating the number density of the Zn phase having a grain size of 10 to 200 nm.

In the plated steel according to the present embodiment, as shown in FIG. 1, the Fe—Al-based alloy layer 3 may be formed between the steel 1 and the plating layer 2. The formation of the Fe—Al-based alloy layer 3 causes an improvement in adhesion between the steel 1 and the plating layer 2 (adhesion via the Fe—Al-based alloy layer 3), which is preferable. In a case of obtaining the above effects, an average thickness of the Fe—Al-based alloy layer 3 is preferably 1.0 to 10.0 μm.

The alloy layer 3 is formed of an Fe—Al-based intermetallic compound (for example, an Fe—Al alloy layer or, in a case where the plating layer contains Si, an Fe—Al—Si alloy layer, collectively referred to as an Fe—Al-based alloy layer).

The presence or absence and the thickness of the Fe—Al-based alloy layer can be obtained by measuring a thickness of the Fe—Al-based intermetallic compound from an element distribution image obtained from an EDS measurement.

The thickness of the plating layer 2 is not limited, but is preferably 7 to 50 μm. Within this range, sufficient corrosion resistance can be obtained and sufficient workability can be secured.

By performing hot stamping on the plated steel according to the present embodiment described above, a hot stamped member excellent in chemical convertibility and LME resistance during spot welding can be obtained. Here, hot stamping conditions are not limited, and known conditions can be adopted.

<Manufacturing Method>

Next, a preferred manufacturing method of the plated steel according to the present embodiment will be described. The effects of the plated steel according to the present embodiment can be obtained as long as the plated steel has the above-described characteristics regardless of the manufacturing method. However, a method including the following steps is preferable because stable manufacturing can be achieved, the method including:

(I) a plating step of immersing a steel in a plating bath to obtain a plated base sheet;

(II) a cooling step of cooling the plated base sheet to a temperature range of 200° C. or lower; and (III) a holding step of reheating the plated base sheet after the cooling step, as necessary, and holding the plated base sheet in a temperature range of 100° C. to 200° C. for 100 seconds or longer.

[Plating Step]

In the plating step, a steel such as a steel sheet is immersed in a plating bath to form a plating layer on a surface of the steel to obtain a plated base sheet.

A composition of the plating layer to be formed can be assumed from a composition of the plating bath, so that the composition of the plating bath may be adjusted according to the desired chemical composition of the plating layer.

The steel provided for the plating step is not particularly limited, and for example, a hot-rolled steel sheet described in JIS G 3131:2018 or a cold-rolled steel sheet described in JIS G 3141:2017 can be used.

In addition, reduction annealing may be performed on the steel prior to the plating step. As annealing conditions, known conditions may be used. For example, the steel may be heated to 750° C. to 900° C. in a 5% $H_2$—$N_2$ gas atmosphere having a dew point of −10° C. or higher and be held for 30 to 240 seconds.

[Cooling Step]

In the cooling step, the plated base sheet after the plating step (pulled up from the plating bath) is cooled after adjusting a plating adhesion amount with a wiping gas such as $N_2$.

During the cooling, after pulling up from the plating bath, cooling (first cooling) is performed so that an average cooling rate down to 380° C. is 20° C./s or faster and slower than 40° C./s, and thereafter cooling to 200° C. or lower (second cooling) is performed so that the average cooling rate between 380° C., and 200° C. is 40° C./s or faster.

By setting the average cooling rate (of the first cooling) down to 380° C. to 20° C./s or faster and slower than 40° C./s. Zn is solid-solubilized in an α phase. Accordingly, in the subsequent holding step, the formation of a Zn phase having a size of 10 to 200 nm in the α phase is promoted. After pulling up from the plating bath, when the average cooling rate down to 380° C. is 40° C./s or faster, Zn cannot be sufficiently solid-solubilized. On the other hand, when the average cooling rate is slower than 20° C./s, Zn is precipitated at a high temperature, and a fine Zn phase cannot be precipitated in the α phase in the subsequent holding step.

By the cooling to 200° C. or lower (second cooling) in which the average cooling rate in a temperature range of 380° C. to 200° C. is limited, the solid-solubilized Zn phase is cooled to a temperature range of 200° C. or lower in a state of being in a supersaturated state. Accordingly, the formation of the Zn phase having a size of 10 to 200 nm in the α phase is promoted in the subsequent holding step. When the average cooling rate in this temperature range is slower than 40° C./s, a fine Zn phase cannot be precipitated in the α phase in the subsequent holding step. The average cooling rate of the second cooling is preferably 60° C./s or faster, more preferably 70° C./s or faster, and even more preferably 80° C./s or faster.

A cooling start temperature (a temperature for switching from the first cooling to the second cooling) for cooling to 380° C. to 200° C. is preferably close to 380° C., but may be between 300° C. and 380° C. as long as the average cooling rate down to 200° C. is 40° C./s or faster.

[Holding Step]

In the holding step, the plated base sheet after the cooling step is held in a temperature range of 100° C. to 200° C. for 100 seconds or longer. During the holding, reheating may be performed as necessary, such as in a case where cooling to 100° C. or lower is performed in the cooling step.

After the above cooling, by performing holding in a temperature range of 100° C. to 200° C. for 100 seconds or longer, the Zn phase having a grain size of 10 to 200 nm is sufficiently precipitated in the α phase.

In a case where a holding temperature is low or a holding time is short, a precipitation amount is insufficient.

On the other hand, in a case where the holding temperature is high, it becomes difficult to form the Zn phase having a size of 10 to 200 nm in the α phase. In addition, since a long holding time causes the Zn phase precipitated in the α phase to grow coarsely, the holding time is set to 1000 seconds or shorter.

In addition, the holding step is preferably performed within 5 minutes after the cooling step (the first cooling and the second cooling) is completed. "The cooling step is completed" is set to a time when the temperature of the steel reaches 200° C.

When the time from the completion of the cooling step to the start of the holding step exceeds 5 minutes, precipitation of an $α_R$ phase, which is a metastable phase, starts, and it becomes difficult to satisfy the number density of the Zn phase in the α phase.

The time from the completion of the cooling step to the start of the holding step is preferably within 1 minute.

Examples

As a steel sheet to be subjected to plating, a cold-rolled steel sheet (0.2% C-2.0% Si-2.3% Mn) having a sheet thickness of 1.6 mm was prepared.

After cutting this steel sheet into 100 mm×200 mm, annealing and hot-dip plating were continuously performed using a batch-type hot-dip plating tester.

During the annealing, the annealing was performed at 860° C. for 120 seconds in an atmosphere containing 5% of $H_2$ gas and a remainder consisting of $N_2$ and having a dew point of 0° C. in a furnace having an oxygen concentration of 20 ppm or less.

After the annealing, the steel sheet was subjected to air cooling with $N_2$ gas, and when a temperature of the steel sheet reached a bath temperature+20° C., the steel sheet was immersed in a plating bath having the bath temperature shown in Tables 1A and 1B for about 3 seconds.

A plated base sheet on which a plating layer was formed was cooled under the conditions shown in Tables 1A and 1B after adjusting a plating adhesion amount to 40 to 80 g/m$^2$ with $N_2$ gas. Thereafter, reheating was performed as necessary, and holding was performed under the conditions shown in Tables 1A and 1B. The temperature of the steel sheet was measured using a thermocouple spot-welded to a central part of the plated base sheet.

A composition of the formed plating layer was as shown in Tables 1A and 1B.

In addition, for an obtained plated steel, an area ratio and a number density of each phase contained in the plating layer were measured by the above-described methods.

In addition, for the obtained plated steel, the plated steel was inserted into a muffle furnace in an air atmosphere set to 900° C., was taken out after 4 minutes had passed, and was subjected to hot stamping in which pressing with a flat sheet die and rapid cooling were performed, thereby obtaining a hot stamped member.

In addition, spot welding was performed on the hot stamped member under the following conditions, a cross section of a welded part was observed, and LME resistance was evaluated with a length of a crack (LME crack).

That is, samples of 50 mm×50 mm were collected from hot stamped members obtained by using plated steels Nos. 1 to 26 shown in the tables, and were overlapped on a commercially available hot-dip galvannealed steel sheet having the same size, and were subjected to spot welding by pressing an energizing electrode to cause a hitting angle (a difference between a direction perpendicular to the surface of the steel sheet and an axial direction of the electrode) to be 7° and a load to be 400 kgf and setting a current pattern to cause a nugget diameter to be 3.5×√t to 5.5×√t (t: sheet thickness). A DR6φ type Cu—Cr electrode according to the JIS standard was used as the energizing electrode.

After the spot welding, the steel sheet was cut in parallel to the direction in which the hitting angle was provided so that a sheet thickness direction cross section could be observed. After the cutting, the cross section of the welded part mirror-polished and finished by mechanical polishing and chemical polishing was observed with an optical microscope, and an LME crack length of an internal crack was measured.

Determination was made as follows depending on the presence or absence and a length of a crack, and excellent LME resistance was determined in a case of AA or A.
(Evaluation)
AA: No crack
A: Crack length 100 μm or less
B: Crack length more than 100 μm and 300 μm or less
C: Crack length more than 300 μm In addition, a sample of 50 mm×100 mm (×sheet thickness) was collected from the hot stamped member, and this sample was subjected to a zinc phosphate treatment according to (SD5350 system: a standard manufactured by Nipponpaint Industrial Coatings Co., LTD.) to form a chemical conversion film.

By observing the surface of the plated steel sheet on which the chemical conversion film was formed by SEM, a ratio (area %) of lack of phosphate coating of the chemical conversion film was measured.

Determination was made as follows according to the ratio of lack of phosphate coating, and excellent chemical convertibility was determined in a case of AA or A.
AA: 5% or less
A: More than 5% and 10% or less
B: More than 10% and 20% or less
C: More than 20%

TABLE 1A

| | | Plating layer chemical composition (remainder: Al and impurities) | | | | | | Bath temperature (° C.) |
|---|---|---|---|---|---|---|---|---|
| | | | | | | Others | | |
| Classification | No. | Zn (mass %) | Mg (mass %) | Si (mass %) | Fe (mass %) | Kind | Total (mass %) | |
| Comparative Example | 1 | 0.0 | 1.0 | 8.0 | 10.0 | — | 0 | 700 |
| Invention Example | 2 | 1.0 | 3.0 | 1.5 | 9.4 | Sb | 0.01 | 700 |
| Invention Example | 3 | 5.0 | 3.0 | 8.0 | 9.5 | Sn | 0.1 | 700 |
| Invention Example | 4 | 5.0 | 0.5 | 2.0 | 10.0 | — | 0 | 690 |
| Invention Example | 5 | 7.0 | 1.5 | 8.0 | 7.3 | Cr | 0.001 | 690 |
| Invention Example | 6 | 7.0 | 0.5 | 8.0 | 8.4 | Mn | 0.001 | 670 |
| Invention Example | 7 | 10.0 | 5.0 | 8.0 | 5.1 | Pb | 0.02 | 670 |
| Comparative Example | 8 | 10.0 | 5.0 | 8.0 | 5.5 | — | 0 | 670 |
| Invention Example | 9 | 15.0 | 5.0 | 8.0 | 5.5 | — | 0 | 670 |
| Invention Example | 10 | 15.0 | 1.5 | 2.0 | 6.6 | — | 0 | 680 |
| Invention Example | 11 | 15.0 | 1.5 | 2.0 | 6.6 | Ti | 0.001 | 680 |
| Invention Example | 12 | 18.0 | 1.5 | 8.0 | 5.1 | — | 0 | 660 |
| Invention Example | 13 | 18.0 | 1.5 | 8.0 | 4.5 | — | 0 | 660 |
| Invention Example | 14 | 18.0 | 1.5 | 8.0 | 5.1 | Ni | 0.1 | 660 |
| Invention Example | 15 | 18.0 | 2.0 | 8.0 | 5.2 | Cu | 0.001 | 660 |

| | | Cooling step | | | | Holding step | |
|---|---|---|---|---|---|---|---|
| | | Average cooling rate between bath temperature and 380° C. (° C./s) | Average cooling rate between 380° C. and 200° C. (° C./s) | Cooling stop temperature (° C.) | Time until holding step (min) | Temperature (° C.) | Time (s) |
| Classification | No. | | | | | | |
| Comparative Example | 1 | 20 | 80 | 70 | <1 | 100 | 500 |
| Invention Example | 2 | 20 | 80 | 70 | <1 | 100 | 500 |
| Invention Example | 3 | 20 | 80 | 70 | <1 | 100 | 500 |
| Invention Example | 4 | 20 | 80 | 70 | <1 | 100 | 500 |

TABLE 1A-continued

| | | | | | | | |
|---|---|---|---|---|---|---|---|
| Invention Example | 5 | 20 | 80 | 70 | <1 | 100 | 500 |
| Invention Example | 6 | 20 | 80 | 70 | <1 | 100 | 500 |
| Invention Example | 7 | 20 | 80 | 70 | <1 | 100 | 500 |
| Comparative Example | 8 | 20 | 80 | 70 | <1 | — | — |
| Invention Example | 9 | 20 | 40 | 70 | <1 | 100 | 500 |
| Invention Example | 10 | 20 | 80 | 70 | <1 | 100 | 500 |
| Invention Example | 11 | 20 | 80 | 70 | <1 | 100 | 500 |
| Invention Example | 12 | 20 | 80 | 70 | <1 | 100 | 500 |
| Invention Example | 13 | 20 | 80 | 70 | 5 | 100 | 500 |
| Invention Example | 14 | 20 | 80 | 70 | <1 | 100 | 500 |
| Invention Example | 15 | 20 | 80 | 70 | <1 | 100 | 500 |

TABLE 1B

| | | Plating layer chemical composition (remainder: Al and impurities) | | | | | | Bath temperature (° C.) |
|---|---|---|---|---|---|---|---|---|
| | | | | | | | Others | |
| Classification | No. | Zn (mass %) | Mg (mass %) | Si (mass %) | Fe (mass %) | Kind | Total (mass %) | |
| Invention Example | 16 | 22.0 | 8.0 | 8.0 | 4.6 | Zr | 0.01 | 660 |
| Invention Example | 17 | 22.0 | 8.0 | 8.0 | 4.6 | Hf | 0.001 | 660 |
| Invention Example | 18 | 22.0 | 8.0 | 8.0 | 4.6 | Sr | 0.001 | 660 |
| Invention Example | 19 | 24.0 | 6.0 | 1.0 | 4.3 | Ca | 0.001 | 660 |
| Invention Example | 20 | 27.0 | 6.0 | 8.0 | 2.1 | Ce: 0.0001, La: 0.0001 | 0.0002 | 650 |
| Invention Example | 21 | 30.0 | 10.0 | 10.0 | 0.8 | — | 0 | 630 |
| Comparative Example | 22 | 35.0 | 1.0 | 7.0 | 3.1 | — | 0 | 670 |
| Comparative Example | 23 | 15.0 | 0.5 | 8.0 | 4.5 | — | 0 | 680 |
| Comparative Example | 24 | 15.0 | 1.5 | 8.0 | 4.5 | — | 0 | 680 |
| Comparative Example | 25 | 15.0 | 3.0 | 8.0 | 4.5 | — | 0 | 680 |
| Comparative Example | 26 | 15.0 | 2.0 | 8.0 | 4.5 | — | 0 | 680 |
| Comparative Example | 27 | 14.0 | 1.0 | 7.0 | 4.0 | — | 0 | 680 |
| Comparative Example | 28 | 15.0 | 1.0 | 7.5 | 4.0 | — | 0 | 680 |
| Comparative Example | 29 | 16.0 | 1.0 | 7.0 | 4.0 | — | 0 | 680 |
| Comparative Example | 30 | 15.0 | 1.0 | 7.0 | 3.5 | — | 0 | 680 |
| Comparative Example | 31 | 15.0 | 1.0 | 7.0 | 3.5 | — | 0 | 680 |

TABLE 1B-continued

| | | Cooling step | | | | Holding step | |
|---|---|---|---|---|---|---|---|
| Classification | No. | Average cooling rate between bath temperature and 380° C. (° C./s) | Average cooling rate between 380° C. and 200° C. (° C./s) | Cooling stop temperature (° C.) | Time until holding step (min) | Temperature (° C.) | Time (s) |
| Invention Example | 16 | 20 | 80 | 70 | <1 | 150 | 300 |
| Invention Example | 17 | 20 | 80 | 70 | <1 | 150 | 300 |
| Invention Example | 18 | 20 | 80 | 70 | <1 | 150 | 300 |
| Invention Example | 19 | 20 | 80 | 70 | <1 | 150 | 300 |
| Invention Example | 20 | 20 | 80 | 70 | <1 | 200 | 100 |
| Invention Example | 21 | 20 | 80 | 70 | <1 | 100 | 500 |
| Comparative Example | 22 | 20 | 80 | 70 | <1 | 100 | 500 |
| Comparative Example | 23 | 20 | 80 | 20 | <1 | 20 | 500 |
| Comparative Example | 24 | 20 | 80 | 70 | <1 | 290 | 500 |
| Comparative Example | 25 | 20 | 80 | 70 | <1 | 290 | 10 |
| Comparative Example | 26 | 20 | 80 | 70 | <1 | 290 | 10 |
| Comparative Example | 27 | 20 | 80 | 70 | <1 | 100 | 1100 |
| Comparative Example | 28 | 60 | 80 | 70 | <1 | 100 | 500 |
| Comparative Example | 29 | 10 | 80 | 70 | <1 | 100 | 500 |
| Comparative Example | 30 | 30 | 30 | 70 | <1 | 100 | 500 |
| Comparative Example | 31 | 20 | 80 | 205 | <1 | 100 | 500 |

TABLE 2A

| | Thickness of plating layer (μm) | Average thickness of Fe—Al-based alloy layer (μm) | Microstructure of plating layer | | | | | | | | |
|---|---|---|---|---|---|---|---|---|---|---|---|
| | | | α phase | | Mg-based IMC in total Area ratio (%) | $MgZn_2$ phase Area ratio (%) | $Mg_2Si$ phase Area ratio (%) | Bulky Zn phase Area ratio (%) | Bulky Si phase Area ratio (%) | Other intermetallic compounds Area ratio (%) | |
| No. | | | Area ratio (%) | Number density of Zn phase having grain size of 10 to 200 mm (/(10 μm × 10 μm)) | | | | | | | LME resistance | Chemical convertibility |
| 1 | 20 | 7.0 | 91.0 | 0 | 4.0 | 0.0 | 4.0 | 0.0 | 5.0 | 0.0 | AA | C |
| 2 | 23 | 6.9 | 95.0 | 10 | 4.7 | 0.0 | 4.7 | 0.0 | 0.0 | 0.3 | A | AA |
| 3 | 25 | 6.7 | 84.6 | 17 | 7.2 | 3.4 | 3.8 | 0.0 | 7.8 | 0.4 | A | AA |
| 4 | 25 | 6.6 | 94.9 | 30 | 2.1 | 0.0 | 2.1 | 0.0 | 3.0 | 0.0 | A | A |
| 5 | 50 | 6.4 | 88.0 | 35 | 4.5 | 0.0 | 4.5 | 0.0 | 7.0 | 0.5 | AA | A |
| 6 | 26 | 6.6 | 90.3 | 48 | 3.0 | 0.0 | 3.0 | 0.0 | 6.4 | 0.3 | AA | A |
| 7 | 25 | 5.8 | 87.9 | 59 | 8.9 | 4.9 | 4.0 | 0.0 | 3.0 | 0.2 | AA | AA |
| 8 | 25 | 6.5 | 89.0 | 0 | 8.0 | 5.0 | 3.0 | 0.0 | 3.0 | 0.0 | B | AA |
| 9 | 25 | 6.5 | 88.7 | 10 | 8.0 | 5.0 | 3.0 | 0.0 | 3.3 | 0.0 | A | A |
| 10 | 26 | 5.6 | 92.3 | 53 | 5.1 | 5.1 | 0.0 | 0.0 | 2.0 | 0.6 | AA | A |
| 11 | 27 | 5.6 | 92.3 | 55 | 5.0 | 5.0 | 0.0 | 0.0 | 2.1 | 0.6 | AA | A |
| 12 | 23 | 6.2 | 86.9 | 55 | 5.1 | 0.0 | 5.1 | 3.0 | 5.0 | 0.0 | A | A |
| 13 | 44 | 6.2 | 86.9 | 20 | 5.1 | 0.0 | 5.1 | 3.0 | 5.0 | 0.0 | A | A |
| 14 | 31 | 6.2 | 87.3 | 55 | 5.0 | 0.0 | 5.0 | 3.0 | 4.7 | 0.0 | A | A |
| 15 | 25 | 5.6 | 83.2 | 58 | 7.0 | 0.0 | 7.0 | 5.0 | 4.6 | 0.2 | A | A |

TABLE 2B

| | | | α phase | Microstructure of plating layer | | | Bulky | | Other | | |
|---|---|---|---|---|---|---|---|---|---|---|---|
| No. | Thickness of plating layer (μm) | Average thickness of Fe—Al-based alloy layer (μm) | Area ratio (%) | Number density of Zn phase having grain size of 10 to 200 mm (/(10 μm × 10 μm)) | Mg-based IMC in total Area ratio (%) | MgZn$_2$ phase Area ratio (%) | Mg$_2$Si phase Area ratio (%) | Zn phase Area ratio (%) | Si phase Area ratio (%) | intermetallic compounds Area ratio (%) | LME resistance | Chemical convertibility |
| 16 | 29 | 5.4 | 86.8 | 40 | 9.9 | 6.9 | 3.0 | 0.0 | 3.0 | 0.3 | A | A |
| 17 | 25 | 5.4 | 86.9 | 37 | 10.2 | 7.2 | 3.0 | 0.0 | 2.6 | 0.3 | A | A |
| 18 | 14 | 5.4 | 86.6 | 35 | 10.0 | 7.0 | 3.0 | 0.0 | 3.1 | 0.3 | A | A |
| 19 | 25 | 5.3 | 85.9 | 43 | 11.7 | 11.7 | 0.0 | 0.0 | 2.0 | 0.4 | A | AA |
| 20 | 10 | 2.9 | 84.0 | 10 | 12.4 | 9.7 | 2.7 | 0.0 | 3.5 | 0.1 | A | A |
| 21 | 25 | 1.0 | 70.5 | 66 | 25.0 | 15.9 | 9.1 | 0.0 | 4.5 | 0.0 | A | A |
| 22 | 22 | 5.0 | 75.0 | 55 | 6.0 | 4.0 | 2.0 | 11.0 | 8.0 | 0.0 | C | A |
| 23 | 24 | 6.5 | 89.8 | 0 | 2.0 | 2.0 | 0.0 | 0.0 | 8.2 | 0.0 | B | A |
| 24 | 25 | 6.4 | 89.6 | 0 | 5.4 | 5.0 | 0.4 | 0.0 | 5.0 | 0.0 | B | A |
| 25 | 25 | 6.5 | 85.0 | 5 | 10.5 | 7.1 | 3.4 | 0.0 | 4.6 | 0.0 | B | A |
| 26 | 24 | 6.0 | 86.0 | 5 | 6.7 | 5.0 | 1.7 | 0.0 | 7.3 | 0.0 | B | A |
| 27 | 22 | 6.5 | 88.0 | 0 | 5.4 | 4.2 | 1.2 | 0.0 | 6.6 | 0.0 | B | A |
| 28 | 24 | 6.1 | 89.4 | 0 | 4.2 | 3.4 | 0.8 | 0.0 | 6.4 | 0.0 | B | A |
| 29 | 25 | 6.0 | 88.2 | 0 | 5.1 | 4.1 | 1.0 | 0.0 | 6.7 | 0.0 | B | A |
| 30 | 28 | 6.2 | 89.3 | 0 | 4.6 | 3.5 | 1.1 | 0.0 | 6.1 | 0.0 | B | A |
| 31 | 23 | 6.0 | 89.1 | 0 | 4.9 | 3.7 | 1.2 | 0.0 | 6.0 | 0.0 | B | A |

As can be seen from Tables 1A to 2B, in Nos. 2 to 7 and Nos. 9 to 21 in which a predetermined chemical composition is provided, the microstructure of the plating layer contained an α phase, and the α phase contained a Zn phase having a grain size of 10 to 200 nm in a number density of 10/100 μm or more, chemical convertibility after hot stamping and LME resistance during spot welding were excellent. Contrary to this, in Comparative Example Nos. 1, 8, and 22 to 31 in which one or more of the chemical composition of the plating layer and the number density of the Zn phase in the α phase were outside of the range of the present invention, chemical convertibility after hot stamping or LME resistance during spot welding was inferior.

BRIEF DESCRIPTION OF THE REFERENCE SYMBOLS

1: steel
2: plating layer
3: Fe—Al-based alloy layer
21: α phase
22: Zn phase
23: MgZn$_2$ phase
24: Mg$_2$Si phase
25: bulky Zn phase
26: Si phase

What is claimed is:
1. A plated steel comprising:
a steel; and
a plating layer formed on the steel,
wherein the plating layer contains, as a chemical composition, by mass %,
Zn: 1.0% to 30.0%,
Mg: 0% to 10.0%,
Si: 0.05% to 10.0%,
Fe: 0 to 10.0%,
0% to 5.00% in total of one or two or more selected from
Ca: 0% to 3.00%,
Sb: 0% to 0.50%,
Pb: 0% to 0.50%,
Sr: 0% to 0.50%,
Sn: 0% to 1.00%,
Cu: 0% to 1.00%,
Ti: 0% to 1.00%,
Ni: 0% to 1.00%,
Mn: 0% to 1.00%,
Cr: 0% to 1.00%,
La: 0% to 1.00%,
Ce: 0% to 1.00%,
Zr: 0% to 1.00%, and
Hf: 0% to 1.00%, and
a remainder of Al and impurities,
a microstructure of the plating layer contains an α phase which is a solid solution of Al and Zn, and
the α phase contains a Zn phase having a grain size of 10 to 200 nm in a number density of 10/100 μm$^2$ or more.
2. The plated steel according to claim 1,
wherein, in the chemical composition, by mass %,
Mg: 0.5% to 10.0% is satisfied.
3. The plated steel according to claim 1,
wherein, in the chemical composition, by mass %,
Mg: 3.0% to 7.0%, and
Zn: 7.0% to 18.0%
are satisfied.
4. The plated steel according to claim 1,
wherein an Fe—Al-based alloy layer is formed between the steel and the plating layer, and
an average thickness of the Fe—Al-based alloy layer is 1.0 to 10.0 μm.
5. The plated steel according to claim 1,
wherein the Zn phase is contained in the α phase in a number density of 30/100 μm$^2$ or more.
6. The plated steel according to claim 2,
wherein an Fe—Al-based alloy layer is formed between the steel and the plating layer, and
an average thickness of the Fe—Al-based alloy layer is 1.0 to 10.0 μm.
7. The plated steel according to claim 2,
wherein the Zn phase is contained in the α phase in a number density of 30/100 μm$^2$ or more.

* * * * *